(12) United States Patent
Mehta

(10) Patent No.: US 6,451,104 B2
(45) Date of Patent: Sep. 17, 2002

(54) METHOD FOR PRODUCING A BLENDED CEMENTITIOUS COMPOSITION

(75) Inventor: Povindar K. Mehta, El Cerrito, CA (US)

(73) Assignee: RHA Technology, Inc., El Cerrito, CA (US)

( * ) Notice: Subject to any disclaimer, the term of this patent is extended or adjusted under 35 U.S.C. 154(b) by 0 days.

(21) Appl. No.: 09/779,192

(22) Filed: Feb. 7, 2001

Related U.S. Application Data

(63) Continuation-in-part of application No. 09/500,138, filed on Feb. 8, 2000.

(51) Int. Cl.$^7$ ............................................... C04B 16/02
(52) U.S. Cl. ..................... 106/705; 106/707; 106/713; 106/714; 106/715; 106/763; 106/DIG. 1
(58) Field of Search .................. 106/705, 707, 106/713, 714, 745, 763, DIG. 1

(56) References Cited

U.S. PATENT DOCUMENTS

| | | | |
|---|---|---|---|
| 4,105,459 A | 8/1978 | Mehta | 106/98 |
| 4,668,541 A | 5/1987 | Fagerlund | 427/397 |
| 4,829,107 A | 5/1989 | Kindt et al. | 524/3 |
| 5,110,362 A | 5/1992 | Hoarty et al. | 106/708 |
| 5,223,035 A | 6/1993 | Hopkins et al. | 106/707 |
| 5,302,200 A | 4/1994 | Smetana et al. | 106/482 |
| 5,346,548 A | 9/1994 | Mehta | 106/705 |
| 5,352,288 A | 10/1994 | Mallow | 106/605 |
| 5,536,310 A | 7/1996 | Brook et al. | 106/708 |
| 5,565,028 A | 10/1996 | Roy et al. | 106/705 |
| 5,593,493 A | 1/1997 | Krofchak | 106/714 |
| 5,735,947 A | 4/1998 | Hopkins et al. | 106/714 |

FOREIGN PATENT DOCUMENTS

AT 302149 10/1972

OTHER PUBLICATIONS

"Studies on inproving moisture resistance of sulfur infiltrated mortars"Mehta et al., Sultur Constr. Proc. Int Conf. 1st (1979), Meeting date 1978, vol. 267–76. (abstract only).*

Primary Examiner—Paul Marcantoni
(74) Attorney, Agent, or Firm—Marsh Fischmann & Breyfogle LLP

(57) ABSTRACT

Cementitious compositions and methods for making the compositions wherein the compositions include high volume of mineral admixtures such as fly ash and blast-furnace slag in combination with rice hull ash. In one embodiment, the cementitious composition is a blend of hydraulic cement, rice hull ash and a mineral addition selected from fly ash and blast-furnace slag. The cementitious compositions can advantageously have high early and 28-day compressive strength and a very low permeability rating.

34 Claims, 1 Drawing Sheet

OTHER PUBLICATIONS

Figure 1:
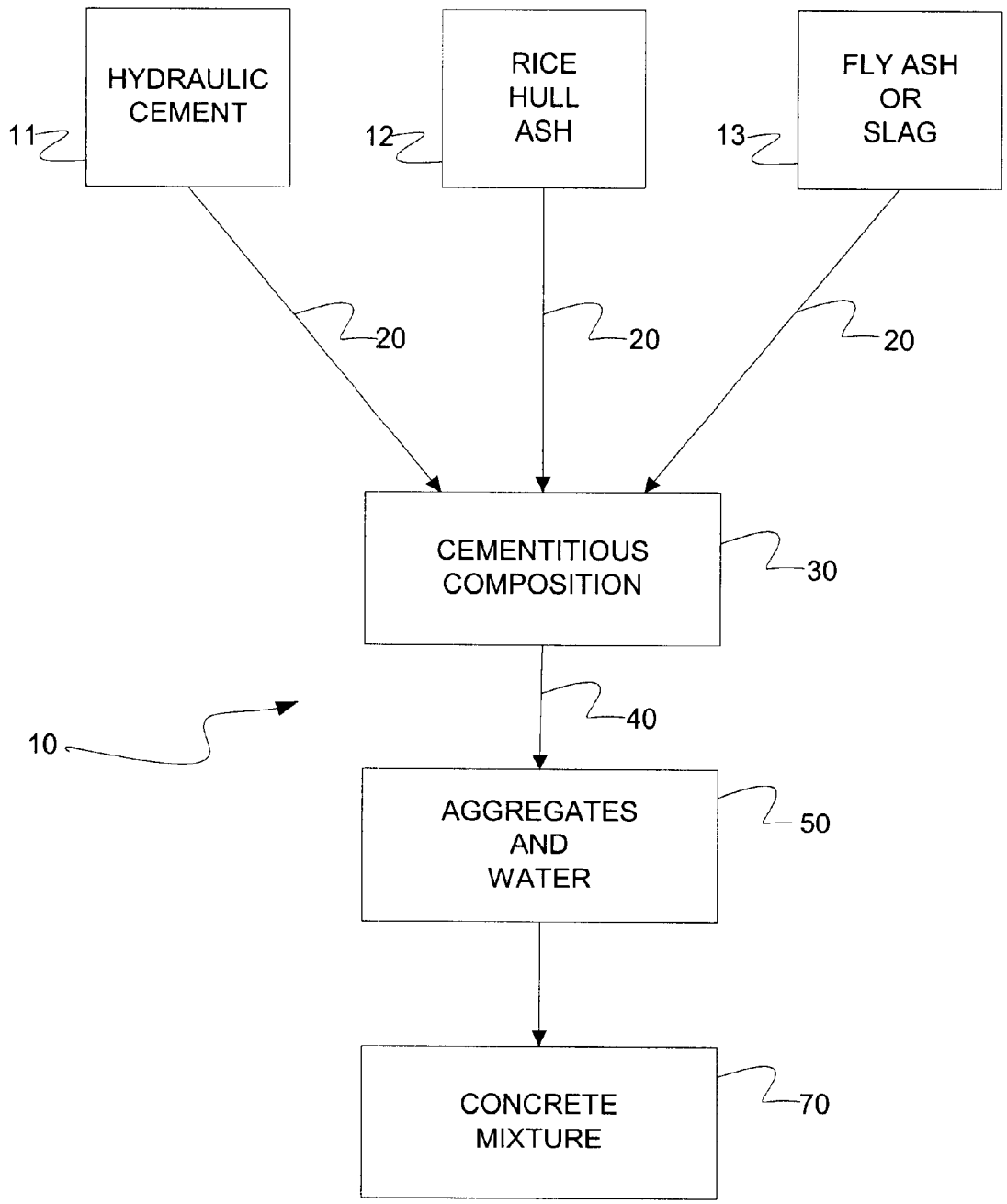

Mehta, P.K., et al., Use of highly active pozzolans for reducing expansion in concretes containing reactive aggregates, ASTM Spec. Tech. Publ. (1976), 597, pp. 25–35 [Abstract only].

Rilem Technical Reports, 73–SBC Rilem Committee, Final Report Siliceous by–products for use in concrete, 1986, pp. 69–80.

Metha, P. Kumar, et al.: Concrete Structure, Properties, and Materials, Second Edition, 1993, Prentice–Hall, Inc., Englewood Cliffs, New Jersey, pp. 47–51.

Mehta, P. Kumar, et al.: Concrete Structure, Properties, and Materials, Second Edition, 1993, Prentice–Hall, Inc., Englewood Cliffs, New Jersey, pp. 120–121.

Mehta, P. Kumar, et al.: Concrete Structure, Properties, and Materials, Second Edition, 1993, Prentice–Hall, Inc., Englewood Cliffs, New Jersey, pp 207–214.

Mehta, P. Kumar, et al.: Chapter 8 Admixtures, Concrete Structure, Properties, and Materials, Second Edition, 1993, Prentice–Hall, Inc., Englewood Cliffs, New Jersey, pp. 256–289.

Malhotra, V.M., Making Concrete "Greener" With Fly Ash, ACI Concrete International, May 1999, pp. 61–66.

Malhotra, V.M., Making Concrete "Greener" With Fly Ash, ACI Concrete International, May 1999, pp. 61–66.

Mehta, P.K. and Polivka, Milos, "Use of Highly Active Pozzolans for Reducing Expansion in Concretes Containing Reactive Aggregates," Living with Marginal Aggregates, ASTM STP 597, American Society for Testing Materials, 1976, pp. 25–35.

"Concrete, Flyash, and the Environment—Proceedings," Mehta, et al., published Jun. 16, 1999 (Environmental Building News).

"Role of Rice–Husk Ash and Silica Fume in Sustainable Development", Mehta et al., pp. 222–241, Proceedings of the International Symposium on Concrete Technology for Sustainable Development in the Twenty–First Century, Feb. 9–11, 1999.

* cited by examiner

METHOD FOR PRODUCING A BLENDED CEMENTITIOUS COMPOSITION

RELATED APPLICATIONS

This application is a continuation-in-part application of U.S. patent application Ser. No. 09/500,138 filed on Feb. 8, 2000.

BACKGROUND OF THE INVENTION

1. Field of the Invention

The present invention relates to a method for producing a blended cementitious composition that includes high levels of mineral additions yielding superior cement-based products such as concrete mixtures and mortar.

2. Description of Related Art

The use of concrete as a construction material has been known for thousands of years. The general properties and advantages of concrete over other construction materials are well known and concrete is presently the most widely used construction material in the world.

Through the centuries, the methods and formulations for making concrete mixtures have changed and many variables have been introduced as the technology has advanced. In general, the materials currently employed in making a concrete mixture are hydraulic cement with sand, gravel or crushed rock and water. The mixture is thoroughly intermixed, placed into the desired formwork and allowed to set. After setting and adequate hardening of the mixture the formwork is removed and the strength development continues to occur over time. The concrete mix proportions vary substantially depending upon a host of considerations. Thus, the proportions of hydraulic cement with sand, crushed rock and water are varied to suit the desired parameters. It is also known that certain types of admixtures can be added to concrete to improve the strength, durability and other properties and to reduce the cost.

It has been known, for example, to add to a concrete mixture certain admixtures known as water-reducers or plasticizers and pozzolans to achieve specific objectives in the resulting concrete product. Water-reducers are chemical admixtures which, when used in small amounts, are able to reduce the water content of a concrete mixture. Water reducing admixtures are well known and widely used throughout the industry. The reduction of water while maintaining a workable consistency or slump is desirable because of the increase in strength and impermeability of the resulting concrete. Normal water-reducing agents are commonly used in the industry and are required by ASTM C 494 to reduce the water content in a concrete mixture by at least 5 percent. The typical water reduction is between 6 percent and 7 percent. A negative side effect of large amounts of normal water-reducing agents, however, is the retardation of the setting time and early strength in the concrete. High-range water-reducing admixtures, also called superplasticizers, can be used in much larger quantities than normal plasticizers. These materials are able to reduce the mixing water by up to 25 percent for a given consistency in a fresh concrete mixture. ASTM C 494 requires a superplasticizer to provide at least a 12 percent reduction of water in the concrete mixture while maintaining the same slump. However, superplasticizers are very expensive.

Pozzolanic and cementitious additions to concrete are known as mineral admixtures. A pozzolan is defined as a siliceous material that reacts with calcium hydroxide in the presence of water at ordinary temperatures to develop cementitious properties. Pozzolans and cementitious materials such as ground, granulated blast-furnace slag can be used either as a concrete admixture or as a cement addition to form a blended portland cement.

U.S. Pat. No. 5,346,548, issued on Sep. 13, 1994 to Mehta, relates to highly durable cement products containing siliceous ashes. The patent discloses the use of a variety of types of materials, including fly ash, slag and a highly pozzolanic rice hull ash, with cementitious materials in the formation of blended cement compositions suitable for the construction of concrete structures.

The prior art, in addition to the foregoing patent, has recognized the desirability of using waste materials in the cementitious composition to enhance the properties of the concrete mixture, to reduce the cost of the mixture, and to dispose of waste materials in an ecological and cost-effective manner.

However, all such prior art methods for producing blended cement compositions known to the inventor tend to employ relatively low percentages of mineral admixtures in formulating blended cement compositions. For example, in the case of fly ash, the percentage has typically been from 5 weight percent to 20 weight percent fly ash in ASTM Type IP and Type IP(M) blended Portland cements. Notwithstanding the beneficial properties achieved in formulating such blended cement compositions, there is a continuing demand for blended cement compositions that have improved properties, both in the construction process as well as in the resultant concrete. It is recognized that in view of the massive quantities of this construction material that are employed throughout the world, it would be desirable to improve upon the properties of this construction material in regard to the workability of the fresh concrete mixture and durability of the resulting hardened concrete in the structure. Because of the extensive use of this construction material in accordance with societal demands throughout the world, there has been considerable interest in reducing the material costs associated with the use of concrete.

Therefore, it has long been known that it would be desirable to provide a method for producing a blended cement composition which permits the achievement of properties in the resultant concrete mixture which are more suited to the objectives desired to be attained; which facilitates the preparation and use of the blended cement composition in virtually all operative environments; which simultaneously with the improved operative properties is less expensive; which avoids the need for using very expensive chemical admixtures which may be intended to produce the same results, but at a great cost and with some disadvantages and side effects; which can be employed to produce a concrete or the like which has improved durability over prior art structures; and which otherwise is entirely effective in achieving its operational objectives.

SUMMARY OF THE INVENTION

It is an object of the present invention to provide an improved blended cement composition containing mineral additions that can be added directly to a concrete mixture, or separately as a component of the cementitious materials in the concrete mixture, which has advantages not heretofore achieved in the art.

According to one embodiment of the present invention, a method for producing a blended cementitious composition is provided. The method includes the step of intermixing at least about 5 weight percent rice hull ash, at least about 30 weight percent of a mineral addition selected from fly ash and blast furnace slag, and a hydraulic cement such as portland cement.

According to another embodiment of the present invention, a blended cement composition is provided. The blended cement composition includes at least about 30 weight percent of a hydraulic cement, from about 5 weight percent to about 20 weight percent rice hull ash and at least about 40 weight percent of a mineral additive selected from the group consisting of fly ash, granulated blast-furnace slag and mixtures thereof.

According to yet another embodiment of the present invention, a concrete mixture is provided. The concrete mixture includes a blended cement composition having at least about 30 weight percent hydraulic cement, at least about 5 weight percent rice hull ash and at least about 30 weight percent of a mineral additive selected from the group consisting of fly ash, blast furnace slag and mixtures thereof. The concrete mixture also includes aggregate and water. The rice hull ash, in combination with high amounts of the mineral additive, advantageously enables the formation of a concrete mixture having good flow properties, as measured by the concrete slump, at low levels of mixing water, without the use of a superplasticizing chemical admixture. These mixtures have good workability, high 28-day strength and low 28-day permeability.

BRIEF DESCRIPTIONS OF THE DRAWING

FIG. 1 is a schematic diagram of a method for producing a blended cementitious composition in accordance with the present invention.

DETAILED DESCRIPTION OF THE INVENTION

The present invention is directed to the use of high levels of mineral additions to a cementitious composition. The blended cementitious composition preferably includes a normal hydraulic cement such as portland cement, a high level of a mineral addition selected from fly ash and granulated blast-furnace slag and a siliceous ash such as rice hull ash. The rice hull ash can be obtained from the burning of crop residues such as rice hull (also called rice husk). According to RILEM Committee 73-SBC Report (Jour. of Structures and Materials, January 1988, p. 89), which is incorporated herein by reference in its entirety, the term mineral addition is used for inorganic materials, both natural materials and industrial by-products that are used in quantities of 5 weight percent or more of the cement. Mineral additions may be blended or interground with cement, or added directly to compositions comprising cement (e.g., concrete or mortar) before or during mixing.

As heretofore noted, it is known in the prior art to use rice hull ash, fly ash, slag, and a wide variety of other substances in the formulation of various types of blended cement compositions employed in the production of concrete of virtually all types. Depending upon the requirements of the application involved, the particular formulation of the blended cement composition is varied to suit the required properties of the concrete. Thus, the operational objectives, for example, for high rise buildings, long span bridges, roadways, dams, retaining walls, simple sidewalks, and the like, may vary to a substantial degree. Similarly, as previously noted, the use of reinforcing structures within the resultant concrete mass may be employed or may be varied depending upon the operational objectives. The ability to adjust the particular formulation to suit these operational objectives is of substantial significance in rendering a particular method for such formulation practical and of value to both the engineers and contractors who may be involved in the construction process itself as well as to the owners, users and those responsible for maintenance of the resulting concrete or other structures once completed.

The present invention differs from the subject matter of the inventor's U.S. Pat. No. 5,346,548 and from the remainder of the prior art known to the inventor in a number of important respects. The inventor has discovered that, in combination with rice hull ash, fly ash or slag can be employed in much greater amounts than has heretofore been considered possible in the published literature, including U.S. Pat. No. 5,346,548. For example, ASTM C 595 relating to blended portland cements permits a maximum of 40 weight percent fly ash in the blended cement composition. However, commercial portland cement/fly ash blended mixtures typically contain only 15 weight percent to 20 weight percent fly ash because the strength and impermeability of conventional concrete products made from mixtures with higher than 20 weight percent fly ash are generally reduced to unacceptably low levels at the early stages of concrete formation. High-volume fly ash blended cement compositions containing more than 40 weight percent fly ash, according to the current state of the art are disclosed by Malhotra in *Concrete International*, Vol. 21, No. 5, May 1999, at pgs. 61–66. However, these compositions invariably require the use of a high dosage of a superplasticizer, which is an expensive chemical admixture, to reduce the water content of the concrete mixture in order to prevent a substantial loss of strength and impermeability at early ages. For example, a high volume fly ash concrete mix described by Malhotra contained 250 lb/yd$^3$ cement, 400 lb/yd$^3$ ASTM Class F fly ash and 200 lb/yd$^3$ water. According to Malhotra, the low ratio of water to cementitious materials (0.3), while obtaining an acceptable consistency of concrete, was achieved by the employment of a large dosage of a superplasticizer.

The present invention is based on the discovery that by incorporating a small amount of a highly pozzolanic rice hull ash (RHA) in these blended cement compositions, it is possible to increase the fly ash or slag content to above 40 weight percent without sacrificing early strength and impermeability of the concrete product, even when no superplasticizer has been added to the concrete mixture. The inventor has also discovered that when used in a volume higher than permitted by ASTM C 595, fly ash itself behaves like a superplasticizer (i.e., meets the ASTM C 494 requirement of a minimum 12 percent water reduction) and tends to negate any extra water requirement that is associated with the use of high surface area pozzolans like rice hull ash.

The beneficial effects of the blended cement compositions of the present invention include achieving compressive strengths in the resulting concrete that are higher than with the use of conventional blended cement compositions. Further, the use of expensive superplasticizers or high-range water reducing agents can be avoided in the concrete mixture, thus enhancing the durability of the concrete in a variety of environments without incurring additional cost. The overall life cycle cost of such substances in the volumes disclosed herein will be significantly lower than where conventional compositions are employed.

Referring more particularly to FIG. 1, a method in accordance with the present invention employing a tertiary blend of substances is generally indicated by the numeral 10. The first substance of this embodiment is indicated by the numeral 11 and comprises at least about 30 weight percent hydraulic cement, such as from about 30 weight percent to about 50 weight percent hydraulic cement, and more preferably at least about 40 weight percent hydraulic cement, such as from about 40 weight percent to about 50 weight percent hydraulic cement.

As is well known in the art, portland cement is a hydraulic cement produced by pulverizing clinker which predominantly comprises hydraulic calcium silicates, and usually contains one or more of the forms of calcium sulfate as a interground addition. As noted in U.S. Pat. No. 4,105,459, a portland cement will typically comprise about 60 to about 69 weight percent of combined and uncombined calcium oxide.

ASTM C 150, Standard Specification for portland cement, covers 8 types of hydraulic cement, all of which may be employed in accordance with the present invention. ASTM C 1157 covers hydraulic cements for both general and specific applications. Both ASTM C 150 and ASTM C 1157 are hereby incorporated by reference in their entirety. Type I is for use when the special properties specified for any other type are not required; no limits are imposed on any of the four principal compounds. Type IA is air-entrained Type I cement, for use where air entrainment is desired (e.g., for making frost-resistant concrete). Type II is for general use, more especially when moderate sulfate resistance or moderate heat of hydration is desired; since $C_3A$ and $C_3S$ produce high heats of hydration, the specification limits the $C_3A$ content of the cement to a maximum of 8 percent, and has an optional maximum limit of 58 percent on the sum of $C_3S$ and $C_3A$ (this limit applies when a moderate heat of hydration is required and test data for heat of hydration are not available). Type IIA is air-entraining Type II cement.

Type III cement is for use when high early strength is desired. To ensure that the high strength is not due mainly to the hydration products of $C_3A$, the specification limits the $C_3A$ content of the cement to maximum of 15 percent. Type IIIA is an air-entraining Type III cement. Type IV is for use when a low heat of hydration is desired. Since $C_3A$ and $C_3S$ produce high heats of hydration, but $C_2S$ produces much less heat, the specification calls for maximum limits of 35 and 7 percent on $C_3S$ and $C_3A$, respectively, and requires a minimum of 40 percent $C_2S$ in the cement. Type V is for use when high sulfate resistance is desired. The specification calls for a maximum of 5 percent on $C_3A$, which applies when the sulfate expansion test is not required.

Types I, II and III are the most commonly used cements, and are particularly preferred in accordance with the present invention.

The second substance 12 of this embodiment of the present invention consists of highly pozzolanic rice hull ash. Preferably, the composition includes at least about 5 weight percent highly pozzolanic fly ash, such as from about 5 weight percent to about 20 weight percent, more preferably from about 5 weight percent to about 15 weight percent of highly pozzolanic rice hull ash.

U.S. Pat. No. 5,346,548, which is incorporated herein by reference in its entirety, discloses the use of a highly pozzolanic rice hull ash and fly ash in the production of compositions employed in the preparation of highly durable cement products. As is described therein, the rice hull ash used as a mineral addition typically includes about 60 to 95 weight percent silica. The ash is further characterized in that generally at least about 90% of the silica is amorphous and at least 75% of the ash particles are in the size range of from about 4 to 75 $\mu$m, preferably from about 10 to about 75 $\mu$m. In addition, the ash particles typically have a mean particle diameter measured by laser-light scattering of at least about 6 $\mu$m and a B.E.T. surface area of at least about 20 m$^2$/g. The median particle diameter is preferably from about 6 $\mu$m to about 38 $\mu$m. It is preferred with respect to workability and cohesiveness that the median particle diameter shall be in the range of about 6 $\mu$m to about 15 $\mu$m.

The third substance of the resulting blended cement composition is identified by the numeral 13 in FIG. 1. The third substance 13 comprises a mineral addition of at least about 30 weight percent fly ash or granulated blast-furnace slag, more preferably at least about 40 weight percent fly ash or granulated blast-furnace slag, and even more preferably at least about 50 weight percent fly ash or granulated blast-furnace slag. In one embodiment the blended cementitious composition includes from about 40 weight percent to about 65 weight percent fly ash or granulated blast-furnace slag, such as from about 50 to about 65 weight percent fly ash or granulated blast-furnace slag. The mineral addition can also include a mixture of fly ash and granulated blast furnace slag. The fly ash can be selected from ASTM Class F fly ash or ASTM Class C fly ash, both of which are widely available.

In accordance with otherwise conventional practices, the first substance 11, second substance 12 and third substance 13 are intermixed as indicated by arrows 20 in FIG. 1 to produce the resulting tertiary blended cementitious composition 30. It will be understood that the resulting composition 30 can then be stored and used later, or mixed in a concrete mixer simultaneously with the addition of aggregate, water and any additional materials 50 as indicated by arrow 40 to form a concrete mixture 70.

High-range water-reducing agents such as superplasticizers in the concrete mixture are advantageously reduced or entirely eliminated according to the present invention. Even a normal water reducing agent (ASTM C 494, Type A) is either not necessary or can be limited to a dosage of not greater than about 1 liter per cubic meter (l/m$^3$). It is preferred that the water-reducing agents are limited to not greater than about 0.5 weight percent of the concrete mixture, more preferably not greater than about 0.25 weight percent of the concrete mixture.

The resulting concrete mixture has many advantageous properties, including good workability, high compressive strength at all ages and a low to very low permeability.

For example, the 28-day compressive strength of the concrete in accordance with ASTM C 39 is preferably at least about 50 MPa and more preferably is at least about 55 MPa. The 28-day permeability as measured in accordance with ASTM C 1202 is preferably not greater than about 1000 coloumbs and more preferably is not greater than about 750 coloumbs. The concrete mixture preferably has a slump, as measured by ASTM C 143, of from about 70 to about 100 mm.

EXAMPLES

The following materials and test methods were used for each of the examples discussed below.

Materials

The cementitious compositions described below are composed of the following materials: a general purpose Type I portland cement (ASTM C 150), a Class F fly ash and a Class C fly ash (ASTM C 618), a granulated blast-furnace slag (ASTM C 989, Grade 80) and a commercially available rice hull ash (RHA). The chemical analysis and the physical properties of these components are listed in Tables I and II, respectively.

X-ray diffraction analysis showed that silica in the rice hull ash was essentially present in a non-crystalline form. The as-received rice hull ash was ground to an average particle size of 6 $\mu$m prior to mixing in the cementitious composition.

TABLE I

Chemical Analysis of Portland Cement, Slag, Fly Ashes and Rice Hull Ash

| | Chemical Analysis (Weight Percent) | | | | |
|---|---|---|---|---|---|
| Component | Portland Cement | Slag | Fly Ash Class F | Fly Ash Class C | Rice Hull Ash |
| $SiO_2$ | 20.3 | 36.6 | 50.5 | 33.9 | 94.37 |
| $Al_2O_3$ | 4.4 | 0.8 | 15.4 | 19.4 | 0.06 |
| $Fe_2O_3$ | 3.0 | 0.5 | 8.8 | 6.1 | 0.04 |
| CaO | 62.9 | 35.1 | 15.6 | 28.2 | 0.48 |
| MgO | 2.7 | 13.0 | 4.0 | 4.8 | 0.13 |

TABLE I-continued

Chemical Analysis of Portland Cement, Slag, Fly Ashes and Rice Hull Ash

Chemical Analysis (Weight Percent)

| Component | Portland Cement | Slag | Fly Ash Class F | Fly Ash Class C | Rice Hull Ash |
|---|---|---|---|---|---|
| $Na_2O$ | 0.3 | 0.4 | 2.5 | 1.9 | 0.08 |
| $K_2O$ | 0.8 | 0.5 | 2.0 | 0.4 | 1.97 |
| $P_2O_5$ | 0.2 | — | 0.1 | 1.5 | 1.19 |
| $TiO_2$ | 0.2 | — | 0.7 | 1.7 | 0.02 |
| $SO_3$ | 3.2 | 3.8 | 1.5 | 3.0 | 0.01 |
| LOI | 2.3 | 1.4 | 0.3 | 0.3 | 1.18 |

TABLE II

Physical Properties of Portland Cement, Slag, Fly Ash and Rice Hull Ash

| Physical Property | Portland Cement | Slag | Fly Ash Class F | Fly Ash Class C | Rice Hull Ash |
|---|---|---|---|---|---|
| Specific Gravity | 3.15 | 2.92 | 2.44 | 2.62 | 2.10 |
| Fineness (% passing 45 pm) | 93.1 | 98.3 | 76.1 | 80.0 | 100.0 |
| Surface Area ($m^2/kg$*) | 402 | 353 | 205 | 422 | 44,000 |
| 7-Day Compressive Strength (MPa) | 33.0 | — | — | — | — |
| 28-Day Compressive Strength (MPa) | 40.8 | — | — | — | — |
| Pozzolanic Activity Index (% at 7 days) | — | — | 85.8 | 94.9 | — |
| Pozzolanic Activity Index (% at 28 days) | — | — | 88.9 | 101.4 | — |
| Slag Activity Index (% at 7 days) | — | 67.6 | — | — | — |
| Slag Activity Index (% at 28 days) | — | 88.0 | — | — | — |

*Surface area was determined by the ASTM standard test method C204 (Blaine test), except for the rice hull ash, which was tested by nitrogen adsorption.

In the current construction practice, almost all concrete mixtures contain a normal water-reducing agent (WRA) in the amount of 0.5 to 1 l/m³ of concrete. Therefore, a normal water-reducing agent (meeting ASTM C 494, Type A) was used in the reference concrete and some of the examples. Examples without any normal water-reducing agents are included to illustrate that it is not necessary to use any water-reducing agents for the purposes of this invention.

The same aggregates were used in all of the concrete mixture examples cited herein. The coarse aggregate was a crushed limestone (19-mm maximum size), and the fine aggregate was a natural sand. To keep the grading uniform for each mixture, both the fine and coarse aggregates were separated into different size fractions that were then recombined to a specific grading. The grading and physical properties of the aggregates are listed in Tables III and IV.

TABLE III

Grading of Aggregates

| Coarse Aggregate | | Fine Aggregate | |
|---|---|---|---|
| Sieve Size | Cumulative Percentage Retained | Sieve Size | Cumulative Percentage Retained |
| 19.0 mm | 0.0 | 4.75 mm | 0.0 |
| 12.7 mm | 40.0 | 2.36 mm | 10.0 |
| 9.5 mm | 65.0 | 1.18 mm | 32.5 |
| 4.75 mm | 100.0 | 600 µm | 57.5 |
| | | 300 µm | 80.0 |
| | | 150 µm | 94.0 |
| | | pan | 100.0 |

TABLE IV

Physical Properties of Aggregates

| | Coarse Aggregate | Fine Aggregate |
|---|---|---|
| Specific Gravity | 2.70 | 2.67 |
| Absorption (%) | 0.4 | 0.8 |

Test Methods

One of the important advantages of the present invention is the formation of a cement product such as fresh concrete having good workability, i.e., good flow characteristics, while reducing the amount of water in the mixture. The flow characteristics can be measured by measuring the slump of the concrete mixture in accordance with ASTM C 143, which is incorporated herein by reference in its entirety. This test involves pouring fresh concrete into a cone-shaped formwork having a height of 300 mm, a bottom diameter of 200 mm and a top diameter of 100 mm. The cone is filled with fresh concrete in accordance with the standard procedure and is then slowly lifted. The unsupported concrete cone slumps down by its own weight and the decrease in height of the cone is called the slump of the concrete. A higher slump number indicates better concrete flow and is generally desirable for good workability.

Concrete cylinders of 102 mm×203 mm (4-inch×8-inch) size were used for determining the compressive strength and resistance to chloride-ion penetration of the concrete.

All of the cylinders were cast in two layers, with each layer being compacted using a vibrating table. After casting the specimens, they were covered with plastic sheets and water-saturated burlap, and left in the casting room for 24 hours. They were then demolded and transferred to the moist-curing room at 100% relative humidity until required for testing.

The compressive strength was determined for each concrete mixture at the ages of 1, 3, 7 and 28 days, using the procedure described in detail in ASTM C 39 Standard Test Method with three cylinders being tested at each age to obtain an average value.

The permeability of concrete to water is the most important property determining the durability of the concrete against most of the processes of deterioration, such as cracking due to freezing and thawing cycles, sulfate attack, alkali-aggregate attack and corrosion of reinforcing steel. Many of the tests for water permeability are very cumbersome and time consuming. However, a chloride permeability test, in accordance with ASTM C 1202 is fairly simple and rapid and there is a high correlation between the results obtained in the chloride permeability test and the results obtained in tests for water permeability (i.e., if a product has decreased permeability to chloride ion it will also have decreased permeability to water).

The ASTM C 1202 Standard Test Method, based on the work of D. Whiting of the Portland Cement Association (Federal Highway Administration, FHWA Report No. RD-81/119, August 1981), involves monitoring of the amount of electrical current passed through a 4-inch diameter concrete disk that is 2-inches thick. One end of the test specimen is immersed in a 3% NaCl solution and the other in a 0.3N NaOH solution. It is possible to accelerate the migration of chloride ions across the specimen by the application of 60 volts d.c. The total charge (Coulombs) that is measured over a 6 hour period is related to the chloride permeability of the concrete.

In this test, a concrete that permits more than 4,000 coulombs is rated as highly permeable concrete; a concrete that permits more than 2,000 coulombs but less than 4,000 is rated as moderately permeable concrete; concrete that permits more than 1,000 coulombs but less than 2,000 is rated as low permeability concrete; and concrete that permits less than 1,000 coulombs is rated as very low permeability concrete (Report No. FHWA/RD-81/119, August 1981). Many ordinary portland cement concrete mixtures exhibit 9,000–12,000 coulombs chloride permeability in the ASTM C 1202 Standard Test and are therefore highly permeable.

In accordance with the foregoing test method, the resistance to chloride-ion penetration of the concrete samples was determined at the age of 28 days, with two specimens being tested for each sample to obtain an average value.

Example 1

In all of the following examples, a 100% portland cement (PC) composition is included for comparison. In Example 1, the properties of concrete mixtures having a blended cement composition including 50 weight percent Class F fly ash, and 40 weight percent Class F fly ash with 10 weight percent rice hull ash were measured. The composition of the mixtures is listed in Table V(a) and the properties are listed in Table V(b). PC refers to portland cement, F-FA refers to Class F fly ash and RHA refers to rice hull ash.

TABLE V(a)

Mix Proportions of the Concrete Mixtures of Example 1

| Cement Composition | Cement (kg/m³) | Water (kg/m³) | Fly Ash (kg/m³) | RHA (kg/m³) | Coarse Aggregate (kg/m³) | Sand (kg/m³) | Normal WRA (mL/m³) |
|---|---|---|---|---|---|---|---|
| 100% PC | 393 | 174 | 0 | 0 | 1126 | 751 | 745 |
| 50% PC 50% F-FA | 199 | 150 | 199 | 0 | 1137 | 758 | 640 |
| 50% PC 40% F-FA 10% RHA | 198 | 158 | 158 | 40 | 1124 | 750 | 585 |

TABLE V(b)

Properties of the Concrete Mixtures of Example 1

| Cement Composition | Slump (mm) | Compressive Strength (MPa) 3 day | 7 day | 28 day | 28-day Permeability (Coulombs) |
|---|---|---|---|---|---|
| 100% PC | 70 | 35 | 39 | 47 | 5020 |
| 50% PC 50% F-FA | 95 | 25 | 34 | 48 | 1370 |
| 50% PC 40% F-FA 10% RHA | 80 | 30 | 43 | 58 | 630 |

Note that the blended cement composition containing 50% Class F fly ash gave 13.6% water-reduction (174 kg/M³ to 150 kg/M³) at a slump that was even higher than the control mix. At a comparable consistency there would be a further water reduction when compared to the control mix. This confirms the superplasticizing effect of fly ash in high-volume fly ash blended cement compositions (i.e., greater than 12% water reduction according to ASTM C 494), which is partially responsible for the substantial drop in the coulomb permeability from 5020 to 1370.

Even when the rice hull ash was included, there was a 9.1% reduction in water content when compared to the control mix. The tertiary blended cement composition containing 10% rice hull ash and 40% fly ash showed a very low permeability rating of less than 1,000 coulombs. The tertiary blended cement composition containing rice hull ash and fly ash showed a substantial increase in the 7-day and the 28-day compressive strengths when compared to concrete mixtures without RHA. More importantly, the strength at all ages including the 3-day strength increased substantially with the tertiary blend when 10% rice hull ash was substituted for some of the fly ash.

Example 2

In Example 2, the level of Class F fly ash and rice hull ash in the blended cement compositions was increased to 60 weight percent of the blended cement composition.

TABLE VI(a)

Mix Proportions of the Concrete Mixtures of Example 2

| Cement Composition | Cement (kg/m$^3$) | Water (kg/m$^3$) | Fly Ash (kg/m$^3$) | RHA (kg/m$^3$) | Coarse Aggregate (kg/m$^3$) | Sand (kg/m$^3$) | Normal WRA (mL/m$^3$) |
|---|---|---|---|---|---|---|---|
| 100% PC | 393 | 174 | 0 | 0 | 1126 | 751 | 745 |
| 40% PC 60% F-FA | 161 | 139 | 240 | 0 | 1133 | 756 | 640 |
| 40% PC 50% F-FA 10% RHA | 160 | 150 | 198 | 40 | 1120 | 747 | 755 |

TABLE VI(b)

Properties of the Concrete Mixtures of Example 2

| Cement Composition | Slump (mm) | Compressive Strength (MPa) 3-day | 7-day | 28-day | 28-day Permeability (Coulombs) |
|---|---|---|---|---|---|
| 100% PC | 70 | 35 | 39 | 47 | 5020 |
| 40% PC 60% F-FA | 105 | 23 | 33 | 50 | 1390 |
| 40% PC 50% F-FA 10% RHA | 95 | 24 | 41 | 57 | 940 |

Note that the blended cement composition containing 60% Class F fly ash gave 20.5% water reduction at a slump that was considerably higher when compared to the control mix. The superplasticizing effect of high-volume fly ash is confirmed because a larger reduction of water content is obtained when the amount of fly ash in the mixture was increased from 50% (Table V(a)) to sixty percent 60% (Table VI(a)).

The data in Table VI(b) show that, compared to the high volume fly ash without rice hull ash, the mixture containing 50% fly ash and 10% rice hull ash showed considerable improvement in the 7-day and 28-day strengths, and a reduction in the coulomb permeability to qualify for the very low permeability rating. Further, there was a 13.6% reduction of water content.

Example 3

In Example 3, various ratios of Class F fly ash and rice hull ash were employed at a total loading of 50% mineral admixtures in the cement composition.

TABLE VII(a)

Mix Proportions of the Concrete Mixtures of Example 3

| Cement Composition | Cement (kg/m$^3$) | Water (kg/m$^3$) | Fly Ash (kg/m$^3$) | RHA (kg/m$^3$) | Coarse Aggregate (kg/m$^3$) | Sand (kg/m$^3$) | Normal WRA (mL/m$^3$) |
|---|---|---|---|---|---|---|---|
| 100% PC | 393 | 174 | 0 | 0 | 1126 | 751 | 745 |
| 50% PC 50% F-FA | 199 | 150 | 199 | 0 | 1137 | 758 | 640 |
| 50% PC 45% F-FA 5% RHA | 198 | 150 | 179 | 21 | 1129 | 751 | 470 |
| 50% PC 40% F-FA 10% RHA | 198 | 158 | 158 | 40 | 1124 | 750 | 585 |
| 50% PC 35% F-FA 15% RHA | 196 | 158 | 138 | 58 | 1111 | 740 | 630 |
| 50% PC 30% F-FA 20% RHA | 195 | 167 | 119 | 79 | 1106 | 736 | 630 |

TABLE VII(b)

Properties of the Concrete Mixtures of Example 3

| Cement Composition | Slump (mm) | Compressive Strength (MPa) 3-day | 7-day | 28-day | 28-day Permeability (Coulombs) |
|---|---|---|---|---|---|
| 100% PC | 70 | 35 | 39 | 47 | 5020 |
| 50% PC 50% F-FA | 95 | 25 | 34 | 48 | 1370 |
| 50% PC 45% F-FA | 95 | 29 | 40 | 60 | 990 |

TABLE VII(b)-continued

Properties of the Concrete Mixtures of Example 3

| Cement Composition | Slump (mm) | Compressive Strength (MPa) 3-day | 7-day | 28-day | 28-day Permeability (Coulombs) |
|---|---|---|---|---|---|
| 5% RHA 50% PC 40% F-FA | 80 | 30 | 43 | 58 | 630 |
| 10% RHA 50% PC 35% F-FA | 80 | 29 | 47 | 56 | 640 |
| 15% RHA 50% PC 30% F-FA | 70 | 28 | 47 | 61 | 450 |
| 20% RHA | | | | | |

The amount of rice hull ash in the tertiary mixtures was varied from zero to 20%. The superplasticizing effect of fly ash is demonstrated by the 13.8% water reduction in concrete made with the blended cement composition containing 50% fly ash. However, it was discovered that 5% fly ash replacement with rice hull ash did not have any adverse effect on the water requirement of the concrete. Consequently, the strength and coulomb permeability of the concrete mixtures made with tertiary cement compositions was significantly enhanced, even when 5% rice hull ash was used instead of 10%.

Example 4

To determine the affect of fly ash type on the water requirement and properties of the concrete, Class C fly ash was utilized in a total amount of 50% of the cement composition, with and without rice hull ash. C-FA refers to Class C fly ash.

TABLE VIII(a)

Mix Proportions of the Concrete Mixtures of Example 4

| Cement Composition | Cement (kg/m$^3$) | Water (kg/m$^3$) | Fly Ash (kg/m$^3$) | RHA (kg/m$^3$) | Coarse Aggregate (kg/m$^3$) | Sand (kg/m$^3$) | Normal WRA (mL/m$^3$) |
|---|---|---|---|---|---|---|---|
| 100% PC | 393 | 174 | 0 | 0 | 0 | 0 | 1126 | 751 | 745 |
| 50% PC 50% C-FA | 199 | 148 | 50 | 199 | 0 | 0 | 1149 | 765 | 0 |
| 50% PC 40% C-FA 10% RHA | 195 | 166 | 40 | 158 | 10 | 39 | 1114 | 743 | 0 |

TABLE VIII(b)

Properties of the Concrete Mixtures of Example 4

| Cement Composition | Slump (mm) | Compressive Strength (MPa) 3-day | 7-day | 28-day | 28-day Permeability (Coulombs) |
|---|---|---|---|---|---|
| 100% PC | 70 | 35 | 39 | 47 | 5020 |
| 50% PC 50% C-FA | 100 | 25 | 40 | 62 | 1921 |

TABLE VIII(b)-continued

Properties of the Concrete Mixtures of Example 4

| Cement Composition | Slump (mm) | Compressive Strength (MPa) 3-day | 7-day | 28-day | 28-day Permeability (Coulombs) |
|---|---|---|---|---|---|
| 50% PC 40% C-FA 10% RHA | 105 | 28 | 43 | 61 | 972 |

Note that the blended cement composition that contains 50% Class C fly ash gave a 15.9% water reduction even without the use of any water reducing agents. Substitution of 10% rice hull ash for the fly ash gave a notable improvement in the 3 and 7 day strengths, however there was a considerable reduction in the coloumb permeability so as to qualify for a low permeability rating.

Further, there was a dramatic reduction in permeability to 972 coulombs when the rice hull ash is added to the Class C fly ash. In addition, the compressive strength is significantly higher than the control mix at 28 days.

Example 5

In Example 5, the loading of Class C fly ash and rice hull ash was increased to 60%.

TABLE IX(a)

Mix Proportions of the Concrete Mixtures of Example 5

| Cement Composition | Cement (kg/m$^3$) | Water (kg/m$^3$) | Fly Ash (kg/m$^3$) | RHA (kg/m$^3$) | Coarse Aggregate (kg/m$^3$) | Sand (kg/m$^3$) | Normal WRA (mL/m$^3$) |
|---|---|---|---|---|---|---|---|
| 100% PC | 393 | 174 | 0 | 0 | 1126 | 751 | 745 |
| 40% PC 60% C-FA | 160 | 143 | 238 | 0 | 1142 | 761 | 0 |
| 40% PC 50% C-FA 10% RHA | 158 | 166 | 195 | 40 | 1113 | 743 | 0 |

TABLE IX(b)

Properties of the Concrete Mixtures of Example 5

| Cement Composition | Slump (mm) | Compressive Strength (MPa) | | | 28-day Permeability (Coulombs) |
|---|---|---|---|---|---|
| | | 3-day | 7-day | 28-day | |
| 100% PC | 70 | 35 | 39 | 47 | 5020 |
| 40% PC 60% C-FA | 115 | 19 | 35 | 59 | 1640 |
| 40% PC 50% C-FA 10% RHA | 105 | 22 | 38 | 61 | 940 |

Note that the blended cement composition that contains 60% Class C fly ash has an 18.2% water reduction without the use of any water reducing agents.

Again, there was a substantial reduction in permeability to 940 coulombs (compared to 1640 coloumbs) when 10% rice hull ash is substituted for some of the Class C fly ash in the blended cement composition. In both cases, the compressive strength was considerably higher than the control at 28 days.

Example 6

In Example 6, blast furnace slag was utilized as a mineral admixture.

TABLE X(a)

Mix Proportions of the Concrete Mixtures of Example 6

| Cement Composition | Cement (kg/m$^3$) | Water (kg/m$^3$) | Slag (kg/m$^3$) | RHA (kg/m$^3$) | Coarse Aggregate (kg/m$^3$) | Sand (kg/m$^3$) | Normal WRA (mL/m$^3$) |
|---|---|---|---|---|---|---|---|
| 100% PC | 393 | 174 | 0 | 0 | 1126 | 751 | 745 |
| 50% PC 50% Slag | 193 | 169 | 193 | 0 | 1123 | 750 | 460 |
| 50% PC 40% Slag 10% RHA | 193 | 171 | 156 | 39 | 1113 | 743 | 735 |

TABLE X(b)

Properties of the Concrete Mixtures of Example 6

| Cement Composition | Slump (mm) | Compressive Strength (MPa) | | | 28-day Permeability (Coulombs) |
|---|---|---|---|---|---|
| | | 3-day | 7-day | 28-day | |
| 100% PC | 70 | 35 | 39 | 47 | 5020 |
| 50% PC 50% Slag | 85 | 23 | 37 | 52 | 1202 |
| 50% PC 40% Slag 10% RHA | 60 | 28 | 47 | 60 | 529 |

Note that the blended cement compositions containing slag did not show any reduction in water content of the concrete mixture. This is probably due to the angular and rough surface texture of the ground granulated slag particles. However, there was a dramatic reduction in permeability from 5020 to 529 coulombs when a tertiary blended cement composition containing rice hull ash and slag was used. Also, the 7 and 28 day compressive strength of the tertiary blended cement composition was considerably higher than the control mixture.

Example 7

In Example 7, the amount of mineral admixture including blast furnace slag was increased to 60%.

TABLE XI(a)

Mix Proportions of the Concrete Mixtures of Example 7

| Cement Composition | Cement (kg/m³) | Water (kg/m³) | Slag (kg/m³) | | RHA (kg/m³) | | Coarse Aggregate (kg/m³) | Sand (kg/m³) | Normal WRA (mL/m³) |
|---|---|---|---|---|---|---|---|---|---|
| 100% PC | 393 | 174 | 0 | 0 | 0 | 0 | 1126 | 751 | 745 |
| 40% PC 60% Slag | 156 | 171 | 60 | 232 | 0 | 0 | 1121 | 748 | 620 |
| 40% PC 50% Slag 10% RHA | 157 | 172 | 50 | 194 | 10 | 39 | 1119 | 746 | 740 |

TABLE XI(b)

Properties of the Concrete Mixtures of Example 7

| Cement Composition | Slump (mm) | Compressive Strength (MPa) | | | 28-day Permeability (Coulombs) |
|---|---|---|---|---|---|
| | | 3-day | 7-day | 28-day | |
| 100% PC | 70 | 35 | 39 | 47 | 5020 |
| 40% PC 60% Slag | 75 | 21 | 37 | 53 | 890 |
| 40% PC 50% Slag 10% RHA | 60 | 24 | 47 | 61 | 470 |

Again, the blended cement compositions containing slag did not show reduction in water content of the concrete mixture. However, there was a dramatic reduction in permeability from 5020 to 470 coulombs when a tertiary blended cement composition containing rice hull ash and slag was used. Also, the 7-day and 28-day compressive strengths of the tertiary blended cement composition was considerably higher than the control composition.

It will be seen upon review of the foregoing examples and as otherwise heretofore discussed that the inventor has discovered that fly ash can be used, in effect, as a substitute for chemical superplasticizers when used in greater percentages (more than 40 weight percent of the blended cement) than permitted by the current ASTM specification for blended portland cements (ASTM C 595). In particular, the present invention is distinct from the prior art in that it constitutes a tertiary blended cement composition containing rice hull ash having a compressive strength in the resulting concrete up to an age of 28 days that is considerably improved. The 28-day coloumb permeability (ASTM C 1202) is drastically reduced and is lower than those achievable in blended cement compositions containing high volumes of fly ash alone. The data also reveals that the early compressive strengths of the resulting concrete is improved and that otherwise conventional high-range water reducing agents such as superplasticizers are not required to achieve the desired results over mixes with just fly ash.

The tertiary cement compositions of the present invention demonstrate considerable improvement even without the employment of normal water-reducing agents (ASTM C 494, Type A). Similar results were obtained with all tertiary combinations containing rice hull ash regardless of whether ASTM Class F fly ash, ASTM Class C fly ash or ASTM standard granulated blast furnace slag was used as the high volume mineral admixture component of the blended cement. Furthermore, very low coloumb permeability ratings of concrete mixtures containing high volumes of fly ash or slag were obtained only when rice hull ash was included in the cement composition. Even a 5% replacement of fly ash with rice hull ash brought the permeability rating to a very low permeability (Table VII(b), Example 3). It can be concluded therefore that the method of the present invention is commercially beneficial.

Therefore, the method for producing a blended cement composition of the present invention permits the achievement of properties in the resultant concrete which are more suited to the objectives desired to be attained; facilitates the preparation and use of the blended cement composition in virtually all operative environments; simultaneously with the improved operative properties is less expensive; avoids the need for using chemical admixtures that may be intended to produce the same results but are expensive and difficult to use and may have disadvantageous side effects; can be employed to produce concrete which has improved durability over prior art; and otherwise is entirely effective in achieving its operational objectives.

Although the invention has been herein shown and described in what is conceived to be the most practical and preferred embodiments, it is recognized that departures may be made therefrom within the scope of the invention which is not to be limited to the illustrative details disclosed.

What is claimed is:

1. A method for producing a blended cementitious composition, the method comprising the step of intermixing at least about 5 weight percent rice hull ash, at least about 40 weight percent fly ash and hydraulic cement.

2. A method as recited in claim 1, comprising the step of intermixing at least about 50 weight percent of said fly ash.

3. A method as recited in claim 1, comprising the step of intermixing from about 50 to about 65 weight percent of said fly ash.

4. A method as recited in claim 1, comprising the step of intermixing from about 5 to about 20 weight percent of said rice hull ash.

5. A method as recited in claim 1, comprising the step of intermixing at least about 30 weight percent of said hydraulic cement.

6. A method as recited in claim 1, comprising the step of intermixing at least about 40 weight percent of said hydraulic cement.

7. A method as recited in claim 1, further comprising the step of intermixing water with said blended cementitious composition.

8. A blended cement composition, comprising:
   a) at least about 30 weight percent hydraulic cement;
   b) from about 5 weight percent to about 20 weight percent rice hull ash; and
   c) at least about 40weight percent of fly ash.

9. A blended cement composition as recited in claim 8, wherein said composition comprises from about 30 weight percent to about 50 weight percent hydraulic cement.

10. A blended cement composition as recited in claim 8, wherein said composition comprises at least about 40 weight percent hydraulic cement.

11. A blended cement composition as recited in claim 8, wherein said composition comprises from about 5 weight percent to about 20 weight percent rice hull ash.

12. A blended cement composition as recited in claim 8, wherein said composition comprises at least about 50 weight percent of said fly ash.

13. A blended cement composition as recited in claim 8, wherein said fly ash consists essentially of Class F fly ash.

14. A blended cement composition as recited in claim 8, wherein said fly ash consists essentially of Class C fly ash.

15. A concrete mixture, comprising:
   a) a blended cement composition comprising at least about 30 weight percent hydraulic cement, at least about 5 weight percent rice hull ash and at least about 40 weight percent fly ash;
   b) aggregate; and
   c) water.

16. A concrete mixture as recited in claim 15, wherein said blended cement composition comprises at least about 40 weight percent hydraulic cement.

17. A concrete mixture as recited in claim 15, wherein said blended cement composition comprises from about 40 weight percent to about 50 weight percent hydraulic cement.

18. A concrete mixture as recited in claim 15, wherein said blended cement composition comprises from about 5 weight percent to about 20 weight percent rice hull ash.

19. A concrete mixture as recited in claim 15, wherein said blended cement composition comprises from about 40 weight percent to about 60 weight percent of said fly ash.

20. A concrete mixture as recited in claim 15, wherein said fly ash consists essentially of Class F fly ash.

21. A concrete mixture as recited in claim 15, wherein said fly ash consists essentially of Class C fly ash.

22. A concrete mixture as recited in claim 15, wherein said concrete mixture comprises not greater than about 1 l/m$^3$ of a normal water-reducing agent (ASTM C 494, Type A).

23. A concrete mixture as recited in claim 15, wherein said concrete mixture has a 28-day compressive strength as measured by ASTM C 39 of at least about 50 MPa and a 28-day permeability as measured by ASTM C 1202 of not greater than about 1000 coloumbs.

24. A concrete mixture as recited in claim 15, wherein said concrete mixture has a 28-day compressive strength as measured by ASTM C 39 of at least about 50 MPa and a 28-day permeability as measured by ASTM C 1202 of not greater than about 750 coloumbs.

25. A concrete mixture, comprising:
   a) a blended cement composition comprising hydraulic cement, rice hull ash and at least about 40 weight percent fly ash;
   b) aggregate; and
   c) water, wherein said concrete mixture has a 28-day compressive strength as measured by ASTM C 39 of at least about 50 MPa and a 28-day permeability as measured by ASTM C 1202 of not greater than about 1000 coulombs.

26. A concrete mixture as recited in claim 25, wherein said blended cement composition comprises from about 30 weight percent to about 50 weight percent hydraulic cement.

27. A concrete mixture as recited in claim 25, wherein said blended cement composition comprises from about 40 weight percent to about 50 weight percent hydraulic cement.

28. A concrete mixture as recited in claim 25, wherein said blended cement composition comprises from about 5 weight percent to about 20 weight percent rice hull ash.

29. A concrete mixture as recited in claim 25, wherein said blended cement composition comprises from about 40 weight percent to about 65 weight percent of said fly ash.

30. A concrete mixture as recited in claim 25, wherein said fly ash consists essentially of Class F fly ash.

31. A concrete mixture as recited in claim 25, wherein said fly ash consists essentially of Class C fly ash.

32. A concrete mixture as recited in claim 25, wherein said concrete mixture comprises not greater than about 1 l/m$^3$ of a normal water-reducing agent (ASTM C 494, Type A).

33. A concrete mixture as recited in claim 25, wherein said 28-day compressive strength is at least about 55 MPa.

34. A concrete mixture as recited in claim 25, wherein said 28-day permeability is not greater than about 750 coulombs.

* * * * *